United States Patent [19]

Lenart et al.

[11] Patent Number: 5,607,179
[45] Date of Patent: Mar. 4, 1997

[54] DEFORMABLE AIR BAG RETAINER

[75] Inventors: Robert A. Lenart, Kettering; Jeffrey A. Shepherd, Troy; James L. Webber, Centerville, all of Ohio

[73] Assignee: General Motors Corporation, Detroit, Mich.

[21] Appl. No.: 539,178

[22] Filed: Oct. 4, 1995

[51] Int. Cl.⁶ .................................................. B60R 21/16
[52] U.S. Cl. ........................ 280/728.2; 280/732
[58] Field of Search ............................. 280/728.2, 731, 280/732

[56] References Cited

U.S. PATENT DOCUMENTS

| | | | |
|---|---|---|---|
| 4,842,300 | 6/1989 | Ziomek et al. | 280/732 |
| 4,941,678 | 7/1990 | Lauritzen et al. | 280/732 |
| 5,096,222 | 3/1992 | Komerska et al. | 280/732 |
| 5,186,492 | 2/1993 | Wright et al. | 280/728.2 |
| 5,195,775 | 3/1993 | Komerska et al. | 280/732 |
| 5,255,937 | 10/1993 | Emambakhsh et al. | 280/728.1 |
| 5,310,213 | 5/1994 | Mori | 280/728.2 |
| 5,326,132 | 7/1994 | Musiol et al. | 280/734 |
| 5,419,584 | 5/1995 | Halford | 280/728.2 |
| 5,470,098 | 11/1995 | Szigethy et al. | 280/728.2 |
| 5,484,165 | 1/1996 | Jenkins et al. | 280/728.2 |

FOREIGN PATENT DOCUMENTS 2237538  5/1991  United Kingdom.

*Primary Examiner*—Kenneth R. Rice
*Attorney, Agent, or Firm*—Kathryn A. Marra

[57] ABSTRACT

An air bag module in a vehicle includes an air bag and a housing for housing the air bag. In addition, a retainer is coupled to the air bag and adapted for attachment to the housing. The retainer includes at least one deformable portion having an undeformed condition prior to attachment of the retainer to the housing and having a deformed condition in which the deformable portion is materially deformed upon attachment of the retainer to the housing such that a size of the retainer is adjustable upon attachment of the retainer to the housing.

20 Claims, 6 Drawing Sheets

DEFORMABLE AIR BAG RETAINER

This invention relates to a vehicle air bag module, and more particularly to a deformable air bag retainer for mounting an air bag to the module.

BACKGROUND OF THE INVENTION

It is well known in motor vehicles to provide an air bag module mounted beneath an opening in the instrument panel. The module typically includes a metal housing having opposing side walls and end walls defining an air bag deployment opening. The module also typically includes an air bag having a mouth portion mounted to the housing by an air bag retainer. The air bag retainer typically has retainer apertures which must be aligned with corresponding air bag apertures on the mouth portion of the air bag. Since the air bag is a flexible material, the air bag retainer is needed to provide support to the mouth portion of the air bag and to stiffen the mouth portion of the air bag for easier attachment of the air bag to the housing. The housing has housing apertures which must be aligned with the retainer apertures and air bag apertures so that fasteners' can be inserted through all three sets of aligned apertures to attach the air bag and retainer to the housing. An inflator is mounted beneath the air bag in the housing and discharges inflator gas to inflate the air bag when sensing predetermined vehicle conditions. The opening in the instrument panel is typically covered by a hinged cover door which is forced open by the deploying air bag.

Numerous air bag retainers are known in the prior art for attaching the mouth portion of the air bag to the housing. Many of these air bag retainers are generally rectangular frames that are attached to either the inside or outside of the housing. During air bag deployment, the discharging inflator gas pressurizes the housing and normally causes the walls of the housing to bulge outward or "bellmouth" during air bag deployment. It is also known that some air bag retainers mounted on the housing may provide structural support to the housing walls to reduce the amount of bellmouthing.

Due to variations in manufacturing tolerances, many prior art air bag retainers have the shortcoming of being difficult to fit flush against the walls of the housing and also difficult to align the retainer apertures and air bag apertures with the housing apertures during assembly. To overcome this shortcoming, the prior art has suggested air bag retainers which are a frame formed of a plurality of pieces held together by fasteners and which are adjustable or slidable relative each other such that the size of the air bag retainer can be adjusted during assembly to the housing. However, such an air bag retainer has many shortcomings such as having numerous components, being expensive to manufacture and assemble, having increased mass, and being difficult to adjust during assembly due to the numerous components of the retainer.

SUMMARY

The present invention solves the shortcoming of the prior art by providing an air bag retainer which is formed as a single component for attachment to the air bag and housing, yet which has a size that is adjustable during assembly to fit flush against the walls of the housing and to easily align the air bag and retainer apertures with the housing apertures. In addition, the retainer selectively provides additional strength to the walls of the housing to reduce bellmouthing of the housing where it is most needed. Advantageously, the retainer of the present invention is lightweight and less expensive to manufacture and easier to assemble than adjustable retainers of the prior art.

These advantages are accomplished in the present invention by providing an air bag module in a vehicle including an air bag and a housing for housing the air bag. In addition, a retainer is coupled to the air bag and adapted for attachment to the housing. The retainer includes at least one deformable portion having an undeformed condition prior to attachment of the retainer to the housing and having a deformed condition upon attachment of the retainer to the housing such that a size of the retainer is adjustable upon attachment of the retainer to the housing. Since the retainer advantageously includes a deformable portion, the retainer does not require a plurality of components which are connected by fasteners to accomplish adjustment of the size of the retainer. Instead, the deformable portions are simply forcibly deformed or altered from an undeformed condition to a deformed condition during the assembly process, thus eliminating the need for fastened or slidably connected parts in the retainer. This advantageously makes the retainer lighter and much easier and cheaper to manufacture and assemble than prior art retainers.

Preferably, the retainer is a continuous frame prior to attachment to the housing. The continuous frame of the retainer may be molded of a polymeric material and include integrally molded reinforcement portions. The retainer may alternately be a one-piece continuous frame made of a single integral piece of metallic material. The retainer advantageously provides support for connection of the air bag to the housing and also provides strength to the housing when assembled thereto to reduce bellmouthing of the housing during air bag deployment.

Also advantageously, the retainer is adjustable simply by attachment of the retainer to the housing. The air bag module is assembled by securing the air bag to the retainer and then by attaching the retainer to the housing by forcibly deforming the material of the deformable portion of the retainer and fastening the retainer to the housing.

Many variations of the deformable portion of the retainer are possible. The deformable portion preferably is an attenuated portion of the retainer which is stretchable or breakable upon attachment of the retainer to the housing. The deformable portion may have a reduced cross-section or be folded or notched. The deformable portion may be inwardly turned, outwardly turned, or upwardly projecting.

In accordance with another aspect of this invention, the housing has spaced apart opposing side walls and spaced apart opposing end walls extending between the side walls. The retainer has spaced apart opposing side portions for attachment to the side walls of the housing and spaced apart opposing end portions extending between the side portions. The end portions of the retainer each include at least one deformable portion. The deformable portions have an undeformed condition prior to attachment of the retainer to the housing and have a deformed condition upon attachment of the retainer to the housing. A size of the retainer is adjustable upon attachment of the retainer to the housing by the movement of the deformable portions to the deformed condition to enable selective spacing of the side portions relative each other.

BRIEF DESCRIPTION OF THE DRAWINGS

An embodiment of the present invention is described, by way of example only, with reference to the accompanying drawings in which.

DESCRIPTION OF THE PREFERRED EMBODIMENT

Figure 1:
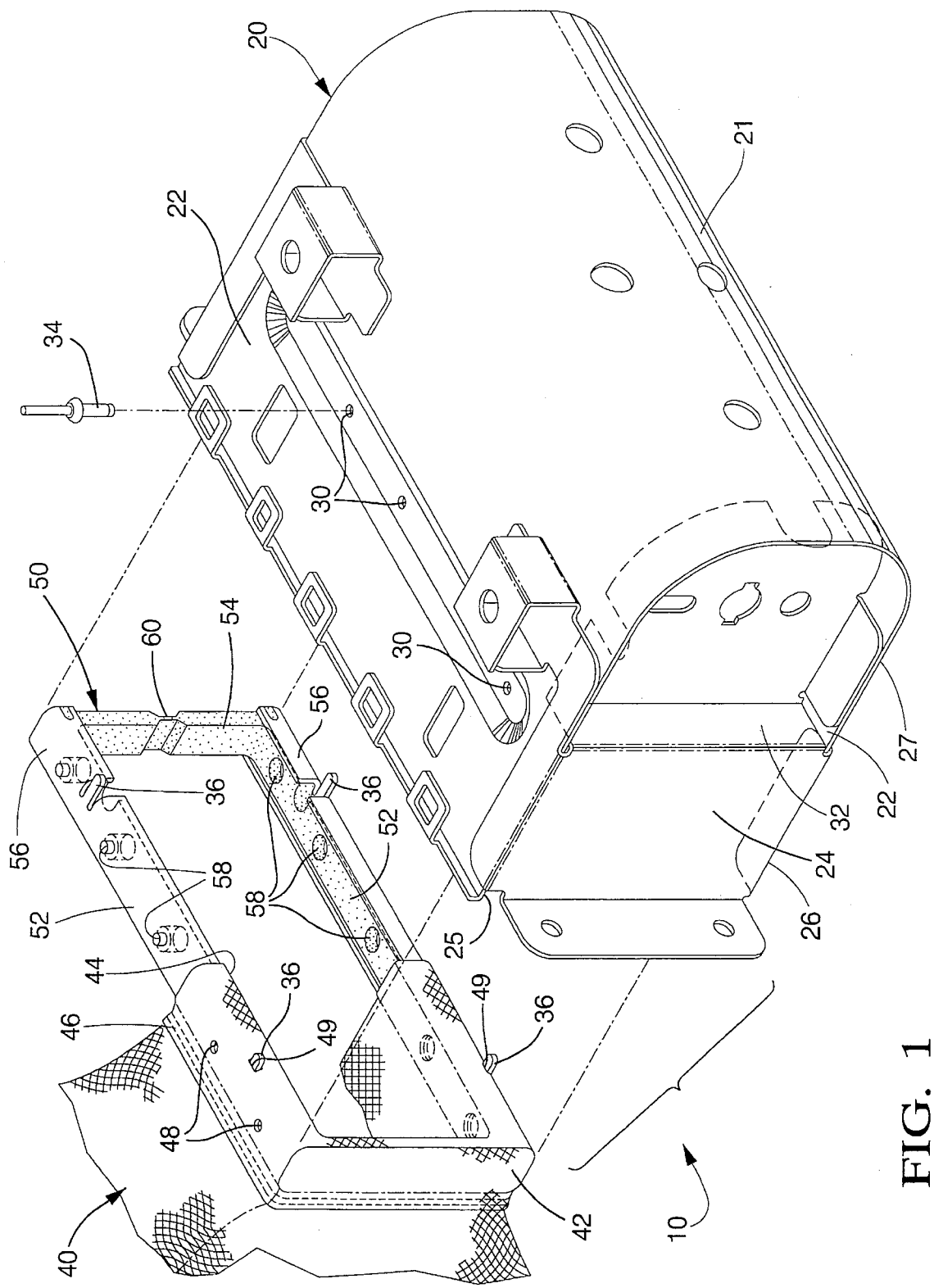
FIG. 1 is an exploded perspective view of an air bag module including a housing and an air bag attached to an air bag retainer.

Referring to FIG. 1, an air bag module 10 includes the component parts of a housing 20, an air bag retainer 50, and an air bag 40 secured to the air bag retainer 50. The housing 20 is preferably a metal canister having a U-shaped bottom wall 21 terminating in upstanding spaced apart opposing side walls 22 connected by spaced apart opposing end walls 24. The side walls 22 and end walls 24 cooperatively define a generally rectangular housing opening 25. The housing 20 includes an upper portion 26 in which the air bag 40 is normally stored prior to inflation and a lower portion 27. The side walls 22 of the housing 20 each include a plurality of spaced apart housing apertures 30 therein for receiving fasteners 34 therethrough, described further hereinafter. An inflator (not shown) is normally mounted in the lower portion 27 of the housing 20 for discharging inflator gas upon sensing predetermined vehicle conditions to inflate the air bag 40. The module 10 is typically mounted beneath the instrument panel (not shown) of a vehicle and covered by a hinged cover door (not shown) prior to deployment.

Figure 2A:
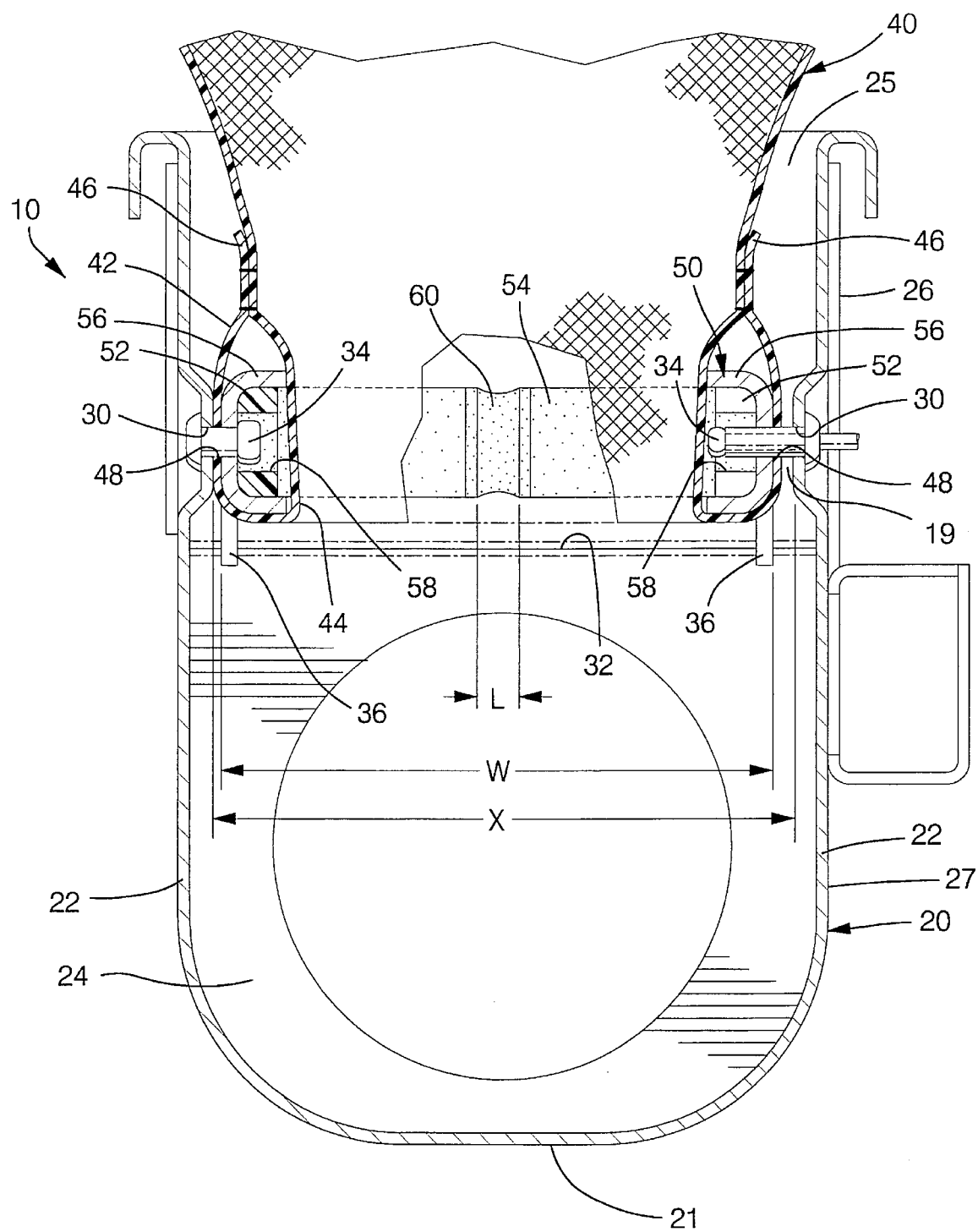
FIG. 2A is cross-sectional view of the air bag module of FIG. 1 shown in a partially assembled condition with the air bag retainer partially assembled to the housing.
Figure 2B:
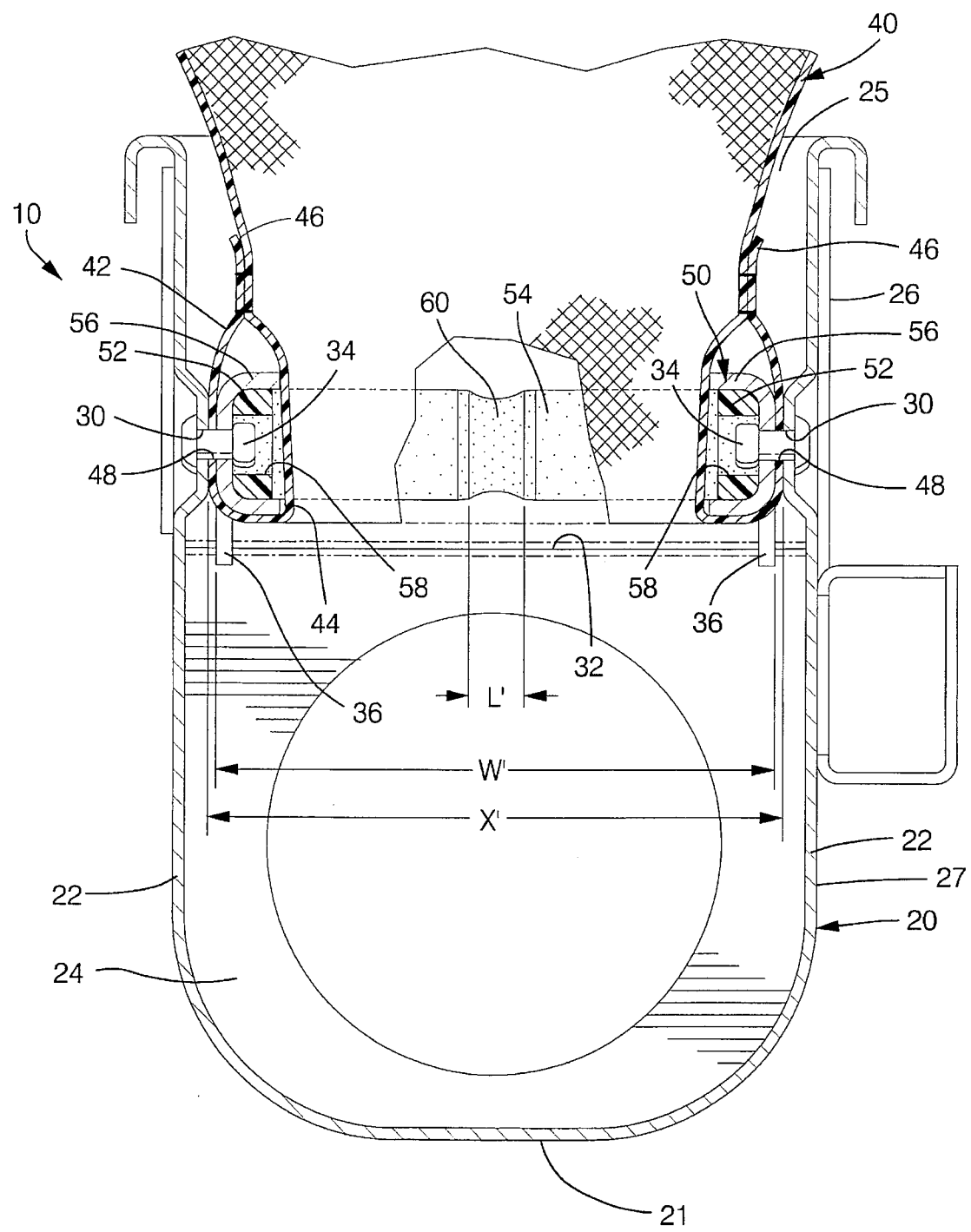
FIG. 2B is a view similar to FIG. 2A, but showing the air bag retainer fully assembled to the housing and showing a deformable portion of the air bag retainer in a deformed condition being stretched.
Figure 2C:
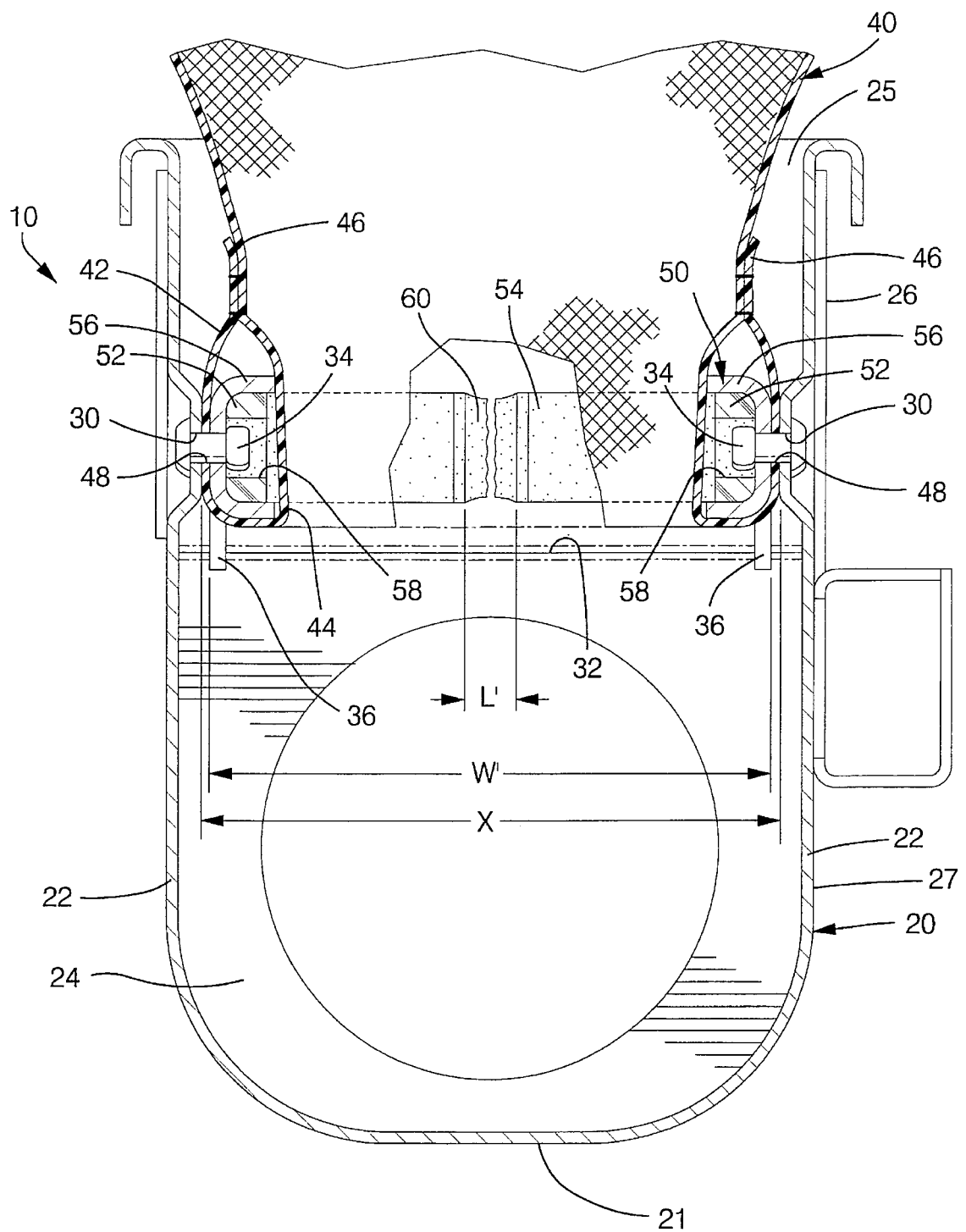
FIG. 2C is a view similar to FIG. 2B, but showing the deformable portion of the air bag retainer in the deformed condition being broken apart.

Referring to FIGS. 1–2C, the air bag 40 is made of a conventional fabric material and is normally stored in a folded condition in the upper portion 26 of the housing 20. The air bag 40 includes a mouth portion 42 forming an air bag opening 44 for receiving inflator gas therethrough. The mouth portion 42 includes a peripheral hem portion 46 formed by appropriately folding and stitching the air bag material. The hem portion 46 of the air bag 40 includes a plurality of air bag apertures 48 which are equivalent in number and correspond for alignment with the housing apertures 30 for receiving the fasteners 34 therethrough, as described further hereinafter.

The air bag retainer 50 is a one-piece continuous frame preferably molded of a polymeric material. Prior to attachment to the housing 20, the retainer 50 has spaced apart opposing side portions 52 connected by spaced apart opposing end portions 54. The side portions 52 of the retainer 50 may each include a reinforcement portion 56 preferably being an elongate metallic member having a C-shaped cross-section. The reinforcement portions 56 are preferably integrally molded with the polymeric frame of the retainer 50 such that the retainer 50 is a single integral component for handling during assembly. The side portions 52, including the reinforcement portions 56, each have a plurality of retainer apertures 58 therethrough equivalent in number and spaced for corresponding alignment with the air bag apertures 48 when the air bag 40 is attached to the retainer 50 and with the housing apertures 30 when the retainer 50 is attached to the housing 20.

Figure 3:
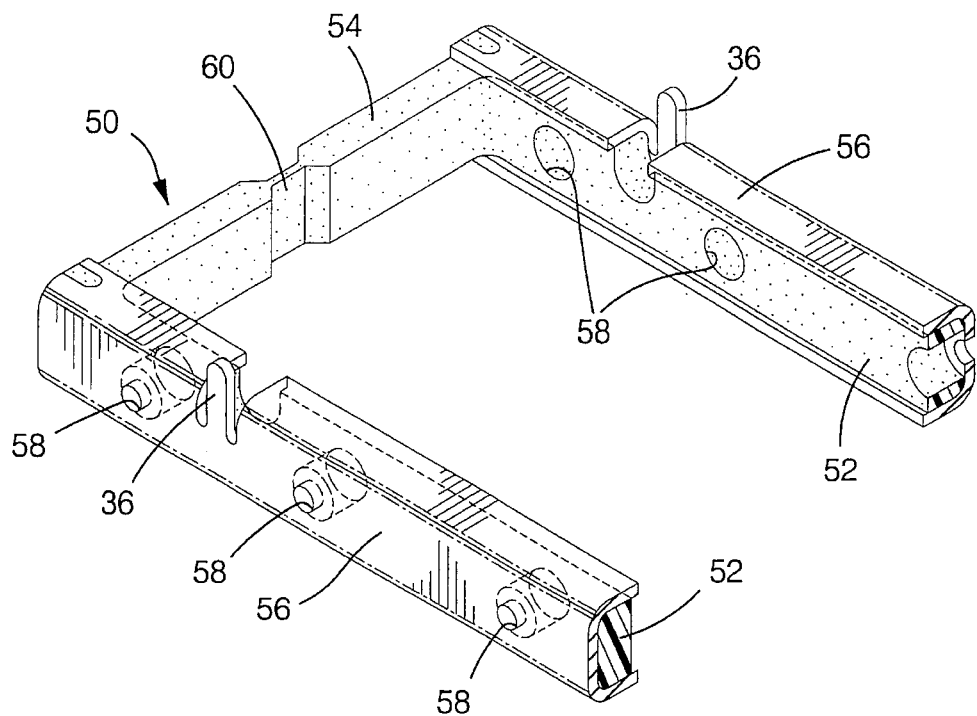
FIG. 3 is a perspective view of the air bag retainer being partially-broken-away and showing a cross-sectional view of side portions of the air bag retainer.

The end portions 54 of the retainer each include a deformable portion 60 having an undeformed condition prior to attachment to the housing 20 and a deformed condition after attachment to the housing 20. The deformable portions 60 are each preferably an attenuated or weakened portion of the retainer 50. The deformable portions 60 each have an initial shape or undeformed condition which is forcibly altered during the assembly process. More specifically, the deformable portions 60 shown in FIGS. 1–3 are straight neck portions having a thinner decreased cross-section and located in the center of the end portions 54. In the undeformed condition, the deformable portions 60 each have a length L and the retainer 50 has a width W which is preferably slightly less than a housing width X between the side walls 22 of the housing 20.

The air bag module 10 is assembled as follows. To assemble the air bag 40 to the retainer 50, the hem portion 46 of the air bag 40 is preferably formed by suitably folding and sewing the mouth portion 42 of the air bag 40 around the retainer 50. The retainer 50 may include downwardly projecting tabs 36 which project out through mating slots 49 in the air bag 40 to rotatively orient the air bag 40 relative to the retainer 50. This ensures that the air bag apertures 48 are aligned with the retainer apertures 58 and remain aligned with the retainer apertures 58 during assembly to the housing 20. After attachment to the retainer 50, the air bag 40 is appropriately folded atop the retainer 50.

After assembly of the air bag 40 to the retainer 50, the retainer 50 and air bag 40 are unidirectionally inserted into housing 20 through the housing opening 25 until the retainer 50 is seated atop a step flange 32 of the housing 20 which approximately vertically locates the retainer 50 relative the housing 20. The housing apertures 30 are now approximately aligned with the retainer apertures 58 and the air bag apertures 48. Since the width W of the undeformed retainer 50 is slightly less than the housing width X, the retainer 50 and air bag 40 easily slide into place in the housing 20. Next, a fastener 34 such as a pop rivet is inserted through each of the respectively aligned housing apertures 30, air bag apertures 48 and retainer apertures 58. Referring to FIG. 2A showing the retainer 50 partially assembled to the housing 20, one of the side portions 52 is assembled to one of the side walls 22 of the housing forming a gap 19 between the retainer 50 and the housing 20. Upon attachment of the other of the side portions 52 of the retainer 50 to the other of the side walls 22 of the housing 20 as shown in FIGS. 2B and 2C, the gap 19 is closed and the deformable portions 60 of the retainer 50 are elongated to the deformed condition. It will be appreciated that during the fastening process, the fasteners 34 pull the side portions 52 of the retainer 50 outward towards the side walls 22 of the housing 20 until the side portions 52 of the retainer 50 directly engage the side walls 22. At the same time, the deformable portions 60 of the retainer 50 are forcibly deformed by pulling and stretching to a deformed condition in which the deformable portions 60 are materially deformed as shown in FIGS. 2B and 2C. Depending upon the elongation properties of the material used to make the retainer 50 and the difference between the undeformed retainer width W and the housing width X, one or both of the deformable portions 60 of the retainer 50 are either stretched out as shown in FIG. 2B or broken as shown in FIG. 2C upon attachment of the retainer 50 and air bag 40 to the housing 20. When the deformable portion 60 is broken as shown in FIG. 2C, the retainer 50 becomes discontinuous, and when both deformable portions 60 are broken the retainer 50 becomes two separate unconnected pieces each attached to the housing 20.

It will be appreciated that after attachment to the housing 20, the deformable portions 60 of the retainer 50 each have an individual new length L' which is greater than the original undeformed length L. In other words, the deformable portions 60 are materially deformed. It will also be appreciated that the retainer 50 has a new overall width W' which is greater than the original width W. As best shown in FIGS. 2B and 2C, the side portions 52 of the retainer 50 fit flush against the side walls 22 of the housing 20. During assembly, the deformable portions 60 of the retainer 50 are forcibly deformed to reduce or eliminate any difference between the undeformed retainer width W and the housing width X. Furthermore, it will be appreciated that the side portions 52 of the retainer 50 are securely attached to the side walls 22 of the housing 20 via the fasteners 34. Advantageously, the side portions 52 of the retainer 50 having reinforcement portions 56 help to strengthen the side walls 22 of the housing 20 to reduce the effects of bellmouthing of the housing 20 during air bag deployment. The deformable portions 60 are located on the end portions 54 of the retainer 50 which are not attached to the housing 20. Thus, the retainer 50 selectively provides strength to the longer side walls 22 of the housing 20 where the support is needed most to reduce bellmouthing. Also, the deformable portions 60 of the end portions 54 are free to stretch or break upon attachment to the housing 20. It will also be appreciated that by forcibly deforming the material of the retainer 50, the retainer 50 is lightweight and easily adjustable compared to retainers 50 of the prior art since the retainer 50 has no separate parts adjustably connected to each other and has no fasteners.

It will further be appreciated that the retainer 50 being a continuous frame is easily handled during assembly as a single part. The retainer 50 secured to the air bag 40 makes it much easier to align the air bag apertures 48 with the housing apertures 30 and also provides supports to the mouth portion 42 of the air bag 40. Advantageously, the retainer 50 itself does not have any portions that are fastened together and no adjustment of fasteners is necessary to modify the width of the retainer 50. Instead, the retainer 50 automatically is deformed to conform to the shape of the housing 20 without any added assembly steps. This is simply accomplished by attachment of the retainer 50 to the housing 20 by fasteners 34, such as pop rivets, which are already necessary steps in the assembly process to attach the retainer 50 and air bag 40 to the housing 20.

It will be understood that a person skilled in the art may make modifications to the preferred embodiment shown herein within the scope and intent of the claims. Although the preferred embodiment shows the retainer 50 as a generally rectangular continuous frame in the undeformed condition, the continuous frame in the undeformed condition could be other geometric shapes having at least one deformable portion 60 which stretches or breaks or otherwise deforms during attachment to the housing. Although the retainer 50 is shown as a continuous frame, the retainer may also be a discontinuous frame in the undeformed condition such that the hem portion 46 of the air bag 40 can be threaded onto the retainer and at least one deformable portion is provided on the discontinuous frame to adjust the size of the retainer. Although the retainer 50 is shown as being attached to the inside of the housing 20, the retainer 50 may also be attached to other locations on the housing 20, such as an outside of the housing or an upper edge of the housing opening 25. In these cases it may be desirable to have a deformable portion 60 which is contracted instead of stretched. Although two reinforcement portions 56 are shown integrally molded with the retainer 50, more than two or no reinforcement portions 56 may be utilized depending on the material and dimensions of the retainer 50. While the deformable portion 60 is shown as a straight neck portion having a thinned down cross-section, numerous other deformable portions 60 are possible to provide an attenuated portion that deforms to modify the dimensions of the retainer 50 during attachment to the housing 20.

Figure 4:
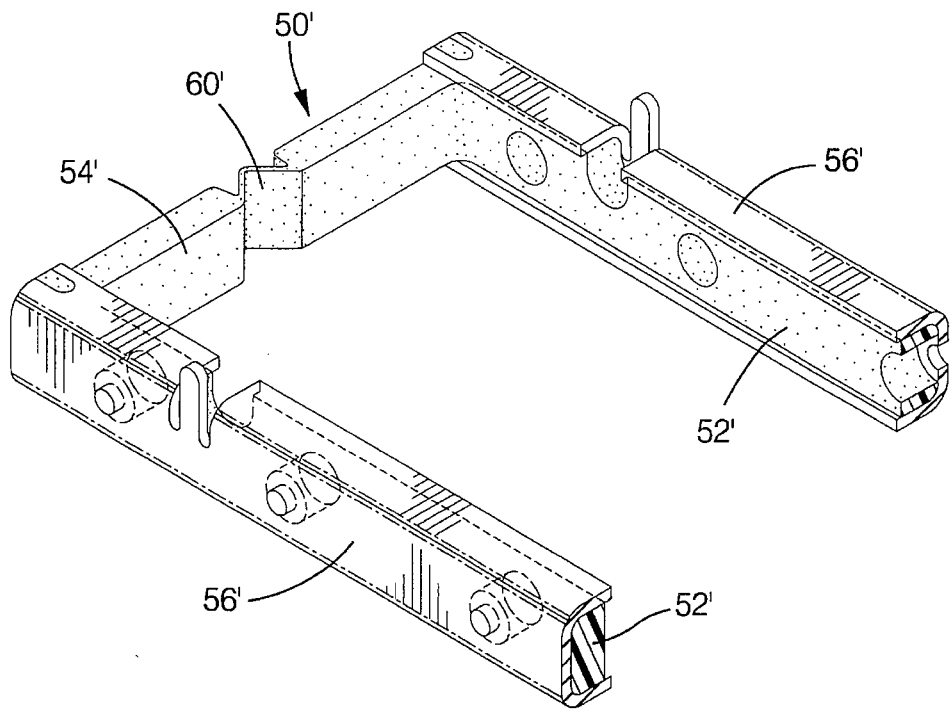
FIG. 4 is a view similar to FIG. 3, showing an air bag retainer similar to FIG. 3 but having an alternate deformable portion.

FIG. 4 shows an alternate embodiment of a deformable portion 60' of the retainer 50' in the undeformed condition for use with the module 10 of FIGS. 1–2. The retainer 50' is a continuous one-piece frame made of a polymeric material. The retainer 50' has side portions 52' and end portions 54' with reinforcement portions 56' integrally molded onto the side portions 52'. Instead of a straight neck portion as shown in FIGS. 1–3, the deformable portion 60' is a partially folded outwardly turned portion having a thinned down cross-section for easy deformation upon attachment of the retainer 50' to the housing 20.

Figure 5:
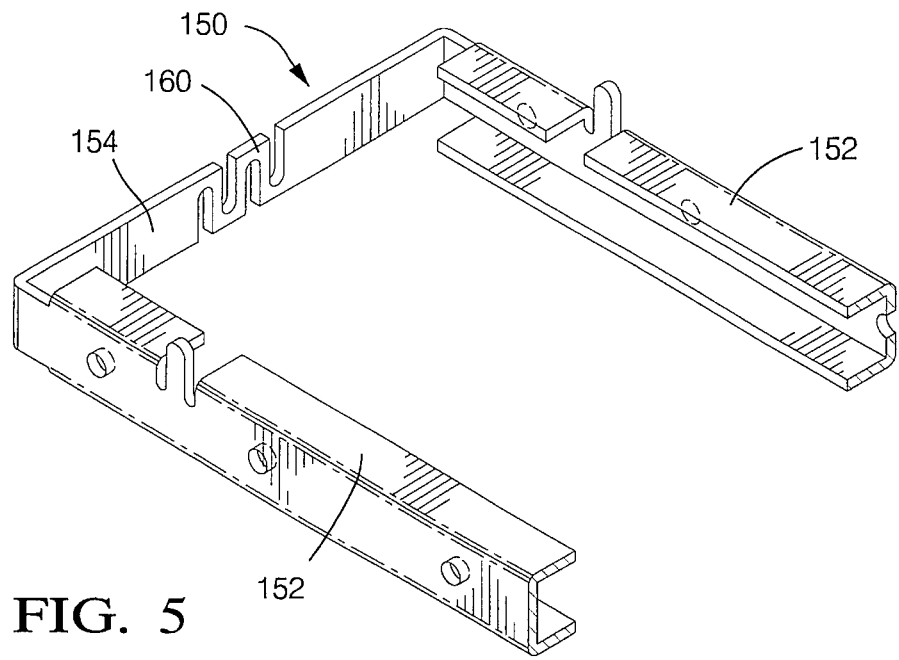
FIG. 5 is a view similar to FIG. 3, but showing an alternate embodiment of the air bag retainer.

FIG. 5 shows an alternate embodiment of a retainer 150 in the undeformed condition for use with the module 10 of FIGS. 1–2. The retainer 150 is a continuous one-piece frame made of a metallic material. The retainer 150 has opposing side portions 152 each preferably having a C-shaped cross-section and opposing end portions 154 each preferably having a planar cross-section. The deformable portion 160 is a notched portion having material selectively removed. The deformable portion 160 is forcibly deformed by attachment of the side portions 152 of the retainer 150 to the housing 20, as described above with respect to FIGS. 1–3.

Figure 6:
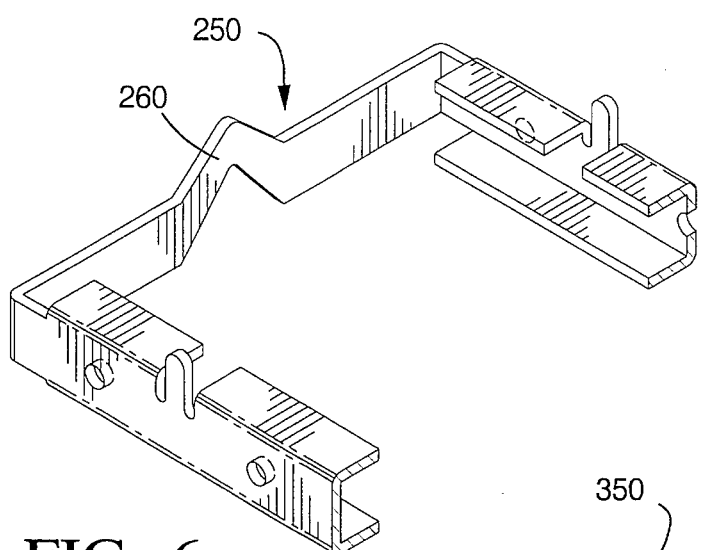
FIG. 6 is a view similar to FIG. 3, but showing yet another alternate embodiment of the air bag retainer.

FIG. 6 shows yet another alternate embodiment of a retainer 250 in the undeformed condition for use with the module 10 of FIGS. 1–2. The retainer 250 is a continuous one-piece frame made of a metallic material, similar to the retainer 150 shown in FIG. 5. However, a deformable portion 260 is a notched out, upturned portion which is forcibly deformed by attachment of the retainer 250 to the housing 20.

Figure 7:
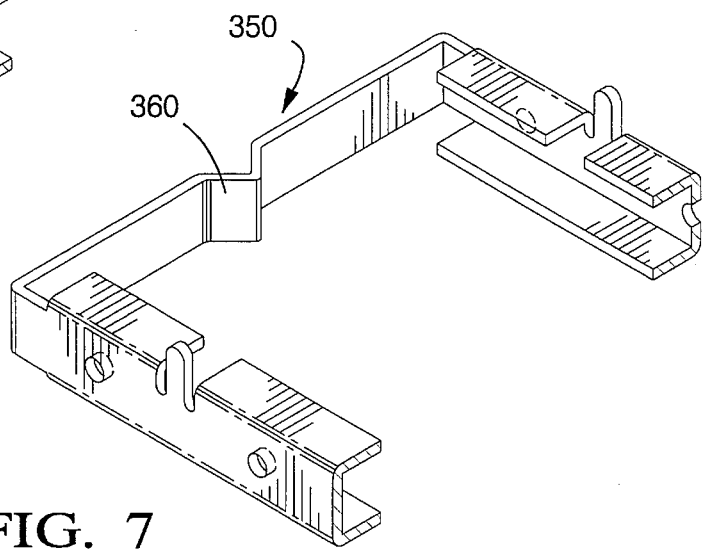
FIG. 7 is a view similar to FIG. 3, but showing still another alternate embodiment of the air bag retainer.

FIG. 7 shows yet another alternate embodiment of a retainer 350 in the undeformed condition for use with the module 10 of FIGS. 1–2. The retainer 350 is a continuous one-piece frame made of a metallic material, similar to the retainer 150 shown in FIG. 5. However, a deformable portion 360 is a folded inwardly turned portion which is forcibly deformed by attachment of the retainer 350 to the housing 20.

While the present invention has been described as carried out in a specific embodiment thereof, it is not intended to be limited thereby but is intended to cover the invention broadly within the scope and spirit of the claims.

The embodiments of the invention in which an exclusive property or privilege is claimed are defined as follows:

1. An air bag module in a vehicle comprising:
   an air bag;

a housing for housing the air bag; and a retainer coupled to the air bag and adapted for attachment to the housing, the retainer including at least one deformable portion having an undeformed condition prior to attachment of the retainer to the housing and having a deformed condition upon attachment of the retainer to the housing such that a size of the retainer is adjustable upon attachment of the retainer to the housing.

2. An air bag module in a vehicle comprising:

an air bag;

a housing for housing the air bag; and a retainer coupled to the air bag and adapted for attachment to the housing, the retainer being a continuous frame prior to attachment to the housing, the retainer including at least one deformable portion having an undeformed condition prior to attachment of the retainer to the housing and having a deformed condition in which the deformable portion is materially deformed upon attachment of the retainer to the housing such that a size of the retainer is adjustable upon attachment of the retainer to the housing.

3. The air bag module of claim 2 wherein the deformable portion is an attenuated portion of the retainer.

4. The air bag module of claim 2 wherein the deformable portion is an attenuated portion of the retainer which is stretchable upon attachment of the retainer to the housing.

5. The air bag module of claim 2 wherein the deformable portion is an attenuated portion of the retainer which is breakable upon attachment of the retainer to the housing such that the retainer is in two separate unconnected pieces when the deformable portion is in the deformed condition.

6. The air bag module of claim 2 wherein the retainer is continuous when the deformable portion is in the undeformed condition and wherein the retainer is discontinuous when the deformable portion is in the deformed condition.

7. The air bag module of claim 2 wherein the deformable portion is an outwardly turned portion of the retainer.

8. The air bag module of claim 2 wherein the deformable portion is an inwardly turned portion of the retainer.

9. The air bag module of claim 2 wherein the deformable portion is a reduced cross-sectional portion of the retainer.

10. The air bag module of claim 2 wherein the deformable portion is an upwardly projecting portion of the retainer.

11. The air bag module of claim 2 wherein the deformable portion is a folded portion of the retainer.

12. The air bag module of claim 2 wherein the deformable portion is a notched portion of the retainer.

13. The air bag module of claim 2 wherein the retainer is made of a material and wherein the deformable portion is formed by selectively removing material from the retainer.

14. The air bag module of claim 2 wherein the retainer is a continuous frame molded from a polymeric material.

15. The air bag module of claim 2 wherein the retainer is a continuous frame molded from a polymeric material and having integrally molded reinforcements disposed thereon.

16. An air bag module in a vehicle comprising:

an air bag;

a housing for housing the air bag having spaced apart opposing side walls and spaced apart opposing end walls extending between the side walls; and a retainer coupled to the air bag and adapted for attachment to the housing, the retainer having spaced apart opposing side portions for attachment to the side walls of the housing and having spaced apart opposing end portions extending between the side portions, the end portions of the retainer each including at least one deformable portion, the deformable portions having an undeformed condition prior to attachment of the retainer to the housing and having a deformed condition in which the deformable portion is materially deformed upon attachment of the retainer to the housing whereby a size of the retainer is adjustable upon attachment of the retainer to the housing by the movement of the deformable portions to the deformed condition to enable selective spacing of the side portions relative each other.

17. The air bag module of claim 16 wherein the deformable portion is an attenuated portion of the retainer which is stretchable upon attachment of the retainer to the housing.

18. The air bag module of claim 16 wherein the deformable portion is an attenuated portion of the retainer which is breakable upon attachment of the retainer to the housing such that the retainer is two separate unconnected pieces in the deformed condition.

19. The air bag module of claim 16 wherein the retainer is a one-piece continuous frame made of a single integral piece of metallic material.

20. A method of assembling an air bag module comprising the steps off providing an air bag housing;

providing an air bag retainer made of a retainer material and having at least one deformable portion;

securing an air bag to the retainer; and attaching the retainer to the housing by forcibly deforming the material of the deformable portion of the retainer and fastening the retainer to the housing.

* * * * *